United States Patent [19]

Ginther et al.

[11] 4,363,573
[45] Dec. 14, 1982

[54] ARTICLE FEEDING APPARATUS

[75] Inventors: Gary D. Ginther, Grayling; Murdo A. MacDonald, Bloomfield Hills, both of Mich.

[73] Assignee: Clyde Corporation, Auburn Heights, Mich.

[21] Appl. No.: 202,426

[22] Filed: Oct. 30, 1980

[51] Int. Cl.³ .............................................. B65G 51/02
[52] U.S. Cl. ....................................... 406/76; 81/430; 221/278; 221/301; 406/153
[58] Field of Search ................... 406/74, 76, 108, 153; 221/278, 299, 301; 81/430

[56] References Cited

U.S. PATENT DOCUMENTS

| 2,544,165 | 3/1951 | Krasnow | 81/430 |
| 2,886,076 | 5/1959 | Shinkle et al. | 81/430 |
| 3,247,874 | 4/1966 | MacDonald | 81/430 |

FOREIGN PATENT DOCUMENTS 2422864 11/1975 Fed. Rep. of Germany ...... 406/153

Primary Examiner—Jeffrey V. Nase
Attorney, Agent, or Firm—Barnes, Kisselle, Raisch, Choate, Whittemore & Hulbert

[57] ABSTRACT

An apparatus for feeding articles with a head and a shank such as screws one at a time to a tool such as a power screwdriver through a hose. The apparatus has a pilot passageway into which articles are transferred one at a time by a metering arm driven by a fluid motor. Preferably, upon transfer, each article is instantaneously propelled through and discharged from the pilot passageway by a stream of compressed air discharged into the pilot passageway downstream of the inlet through which articles are transferred into the pilot passageway. Each article is propelled through the pilot passageway initially by aspiration and, subsequently, by the stream of compressed air impinging on the article. Alternatively, each article falls due to gravity through the pilot passageway and a portion of the hose and is then propelled through the hose by a stream of compressed air.

14 Claims, 10 Drawing Figures

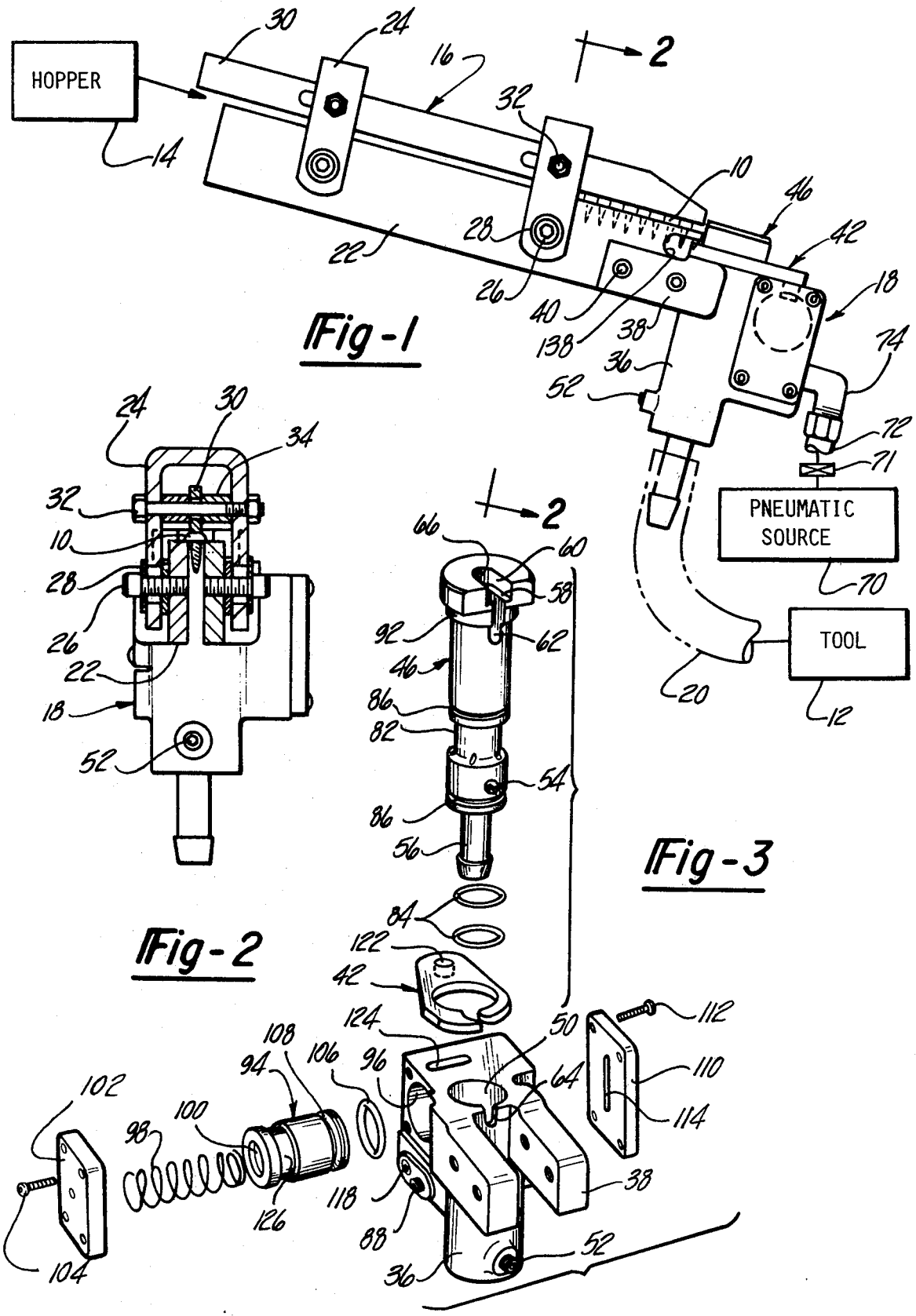

ARTICLE FEEDING APPARATUS

BACKGROUND OF THE INVENTION

This invention relates to a feeding apparatus and, more particularly, to an apparatus for feeding articles one at a time to a power tool such as a screwdriver for automatically driving screws in mass production and assembly line operations.

Articles having a head and a shank such as bolts and screws are extremely difficult to rapidly feed generally axially one at a time from a succession of the articles in generally parallel side-by-side relationship. Because they have so many edges, such articles are highly susceptible to becoming caught or hung up in the feeding apparatus.

While many devices have been previously devised for rapidly and repetitively feeding such articles one at a time, few of such devices have been successful in mass production and assembly operations. However, one device which has been satisfactory and highly commercially successful is disclosed in MacDonald U.S. Pat. No. 3,247,874 issued on Apr. 26, 1966. This patent discloses a complex apparatus for feeding screws one at a time to a power screwdriver. The screws are forced by compressed air through a flexible hose and into an adapter mounted on the nose of the screwdriver. The adapter releasably holds and positions one screw at a time for being driven by the screwdriver into a workpiece.

The apparatus for feeding the screws through the flexible hose is complex and has numerous parts including six parts which move in a complicated cycle of several discrete steps to remove one screw at a time from a guide track and feed it through the hose. Thus, manufacture of this feed apparatus is relatively expensive and it requires frequent service and replacement of several moving parts to maintain the apparatus in good working order for high speed mass production and assembly operations. Moreover, adapting the apparatus to feed a different size screw requires changing at least four parts and often as many as seven parts.

BRIEF SUMMARY OF THE INVENTION

In accordance with this invention, a succession of articles such as screws disposed in side-by-side relationship are transferred one at a time through an inlet into a pilot passageway by a guide and a metering arm driven by a fluid motor. Preferably, each screw is immediately propelled through the pilot passageway and a flexible hose connected to the outlet of the passageway by a stream of compressed air injected into the pilot passageway downstream of the inlet. A partial vacuum is created in the pilot passageway by this air stream which assists in initially propelling the screw through the passageway and into the stream of compressed air which propels the screw out of the pilot passageway and through the hose. Alternatively, and particularly where it is necessary to convey the article a very long distance through the hose, each article falls due to gravity through the pilot passageway and a portion of a hose, and is then propelled through the hose by the stream of compressed air.

To facilitate readily adapting the apparatus to feeding articles of a different size, preferably the guide and pilot passageway are formed in a barrel which is removably received in a housing to enable rapid replacement with another barrel having a different diameter pilot passageway. Preferably, the metering arm is also removably mounted on the barrel to enable rapid replacement with another metering arm adapted to transfer articles of a different size.

Objects, features, and advantages of this invention are to provide a feed apparatus which is of greatly simplified design, has far fewer parts, has only two moving parts, significantly decreases the likelihood of articles becoming hung up or jammed when being transferred and fed one at a time, can propel articles significantly farther, can feed articles at a significantly greater rate, is significantly less expensive to manufacturing and assemble, is readily and easily adapted to feeding different size articles, requires significantly less maintenance and repair, and has significantly improved durability, reliability, and performance in mass production and assembly operations.

These and other objects, features, and advantages of this invention will be apparent from a perusal of the following detailed description, appended claims, and accompanying drawings in which:

FIG. 1 is a semi-schematic side view of a feeding apparatus embodying this invention installed in a system for feeding articles such as screws one at a time through a flexible hose to a power tool such as a screwdriver.

FIG. 2 is a sectional view on line 2—2 of FIG. 1.

FIG. 3 is an exploded view of the component parts of the feeding apparatus of FIG. 1.

DETAILED DESCRIPTION OF THE PREFERRED EMBODIMENT

Figure 4:
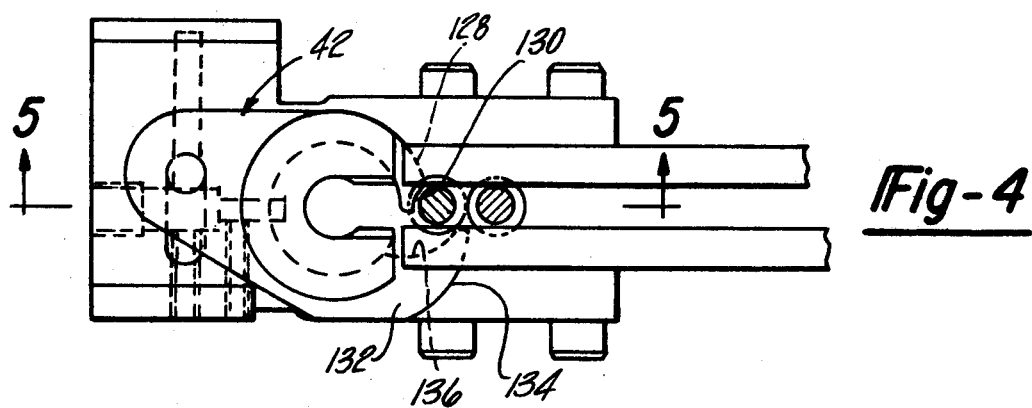
FIG. 4 is a fragmentary top view of the feeding apparatus of FIG. 1 with its metering arm shown in the retracted position.

Referring in more detail to the drawings, FIG. 1 illustrates a system for supplying articles having a head and a shank such as screws 10 to a power tool 12 such as a power screwdriver for driving the screws into a workpiece. The screws 10 are initially received in a conventional hopper 14 and are supplied by an inclined chute 16 to a feeding apparatus 18 embodying this invention. Apparatus 18 feeds and propels the screws 10 one at a time through a flexible hose 20 and into an adapter on the power screwdriver which releasably holds and positions the screws for being driven into a workpiece. The power screwdriver and adapter may be of conventional construction such as that disclosed in U.S. Pat. No. 3,247,874.

As shown in FIGS. 1 and 2, the chute 16 lines up the screws 10 in succession with their shanks extending generally parallel to each other and their heads abutting one another. The heads of the screws 10 are received in chute 16 on a pair of parallel rails 22 secured in laterally spaced apart relationship to U-brackets 24 by cap screws 26 and washers 28. The heads of the screws are retained in engagement with the upper edges of the rail 22 and prevented from overriding one another by a restainer bar 30 slidably mounted on the brackets 24 by bolts 32 and spacer bushings 34. The feeding apparatus 18 is positioned to receive screws from the lower end of the chute 16. The feeding apparatus 18 has a housing 36 with legs 38 mounted on the rails 22 of the chute by cap screws 40.

Figure 5:
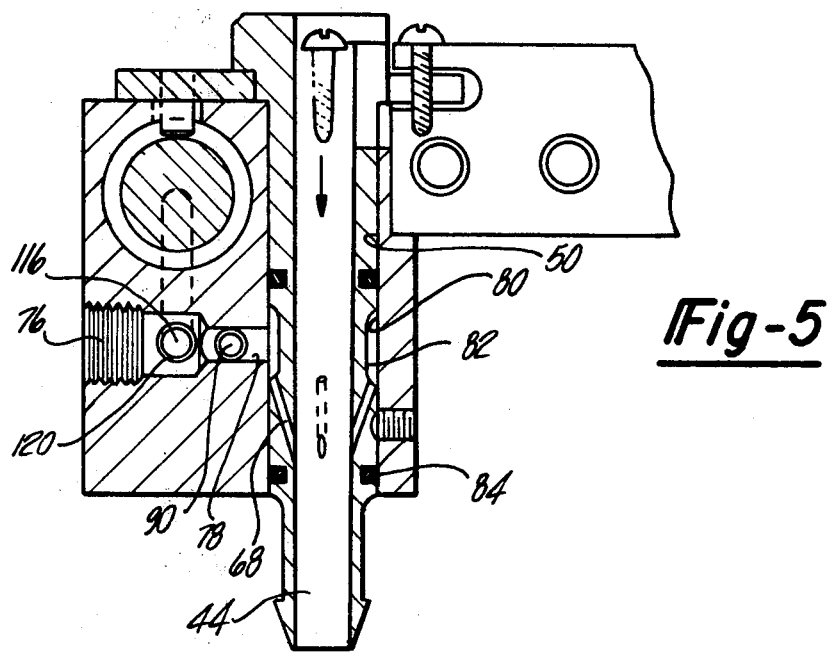

The screws 10 are transferred by a metering arm 42 into a pilot passageway 44 through a barrel 46. As shown in FIGS. 3 and 5, to facilitate rapid removal and replacement, the barrel 46 is slidably received in a bore 50 through the housing 36 and releasably retained therein by a set screw 52 received in the housing and engaging a dimple 54 in the barrel. The pilot passageway 44 extends axially through the barrel 46 which terminates at its lower end in a discharge spout 56 to which the hose 20 may be connected. Preferably, the diameter of the pilot passageway 44 is about 0.030 of an inch greater than the maximum diameter of the heads of the screws 10.

Each screw 10 is guided into the upper end of the pilot passageway 44 with its shank depending from its head and extending generally coaxially in the passageway by shoulders 58 formed by a recess 60 and a slot 62 in the barrel 46. To provide clearance for the shank of the screw, slot 62 and a mating slot 64 in the housing 40 are slightly wider than the diameter of the shank and somewhat deeper than the length of the shank. To provide clearance for the head of the screw, recess 60 is somewhat wider than the diameter of the head. To prevent the head of the screw from hanging up in the upper end of the passageway 44, the width of the recess 60 is equal to the diameter of the passageway 44 and has a semi-cylindrical end wall 66 coaxial with and complementary to the passageway.

In accordance with one feature of this invention, each screw 10 is initially propelled through passageway 44 by the effect of aspiration or a partial vacuum created in the upper portion of the passageway by a plurality of streams of compressed air discharged into the passageway through four equally circumferentially spaced ports 68 in the central portion of the passageway. This aspiration is believed to both stabilize the generally coaxial orientation of the screw in the passageway 44 and increase the force with which the screw is discharged from the passageway. This aspiration, usually but not necessarily, in conjunction with gravity, is believed to rapidly initially accelerate the screw 10 so that the screw is traveling at a significant speed when it passes through and is impinged upon and thereby further propelled by the streams of compressed air issuing from the ports 68. Each port 68 is inclined at an included angle to the axis of the pilot passageway 44 in a range of about 2° to 45°, desirably about 5° to 30° and, preferably about 15°.

Compressed air is supplied to each aspirator port 68 from a source 70 (FIG. 1) through a valve 71 and a conduit 72 connected by a fitting 74 to an air inlet passage 76 in the housing 36 which is connected by an intermediate passage 78 to a chamber 80 communicating with each of the ports. The chamber 80 is defined by the cooperation of the bore 50 in the housing 36 and a circumferentially continuous groove 82 in the barrel 46. Compressed air is prevented from escaping between the barrel 46 and the bore 50 by O-rings 84 received in grooves 86 in the barrel. The rate of flow of compressed air to the aspirator ports 68 is adjusted and controlled by a metering set screw 88 threaded in the housing 36 so that it can be moved across the intermediate passage 78 for cooperation with a seat 90 (FIG. 5).

In accordance with another feature of this invention, to facilitate rapid removal and replacement of the metering arm 42, it is removably journaled for rotary oscillation by a bearing 92 on the barrel 46. The metering arm 42 is driven by a fluid motor having a piston 94 slidably received in a cylinder bore 96 through the housing 36. The piston 94 is yieldably biased to one end of the cylinder 96 by a compression spring 98 with one end received in a blind hole 100 in the piston and the other end bearing on a cover plate 102 secured to the housing by bolts 104. A seal is provided between the cylinder 96 and the piston 94 by a packing 106 received in a groove 108 in the piston. The other end of the cylinder 96 is closed and sealed by a cylinder head plate 110 secured to the housing by bolts 112.

To move the piston 94 against the bias of the spring 98, compressed air is admitted to the head end of the cylinder 96 through a groove 114 in the head plate 112 which communicates with the inlet passage 76 through a connecting passage 116. To adjust and control the rate of flow of compressed air to the cylinder 96, a metering set screw 118 is threaded in the housing for cooperation with a seat 120 (FIG. 5) at the inlet of the connecting passage 116. The metering arm 42 is coupled to the piston 94 for rotary motion in response to reciprocation of the piston by a pin 122 pressed into the arm, extending through an elongate slot 124 in the housing 36, and projecting into a groove 126 in the piston 94.

Figure 8:
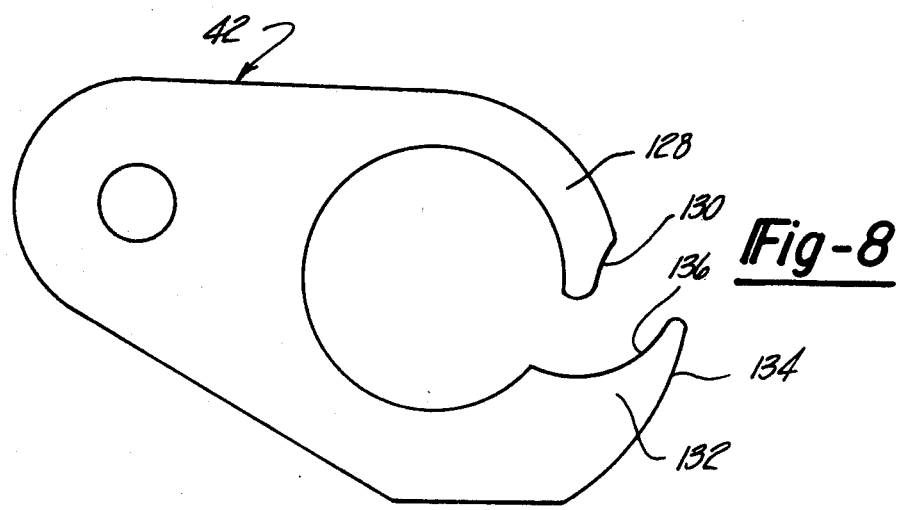
FIG. 8 is a top view of the metering arm of the apparatus of FIG. 1.

In accordance with another feature of this invention and as shown in FIG. 4, the screws 10 in the chute 16 are selectively prevented from entering the passageway by a retention finger 128 on the metering arm 42. Finger 128 has an arcuate abutment face 130 (FIG. 8) which is positioned to bear on the shank of the leading or first screw 10 at the lower end of the chute, when the metering arm is in the retracted position shown in FIG. 4.

Figure 6:
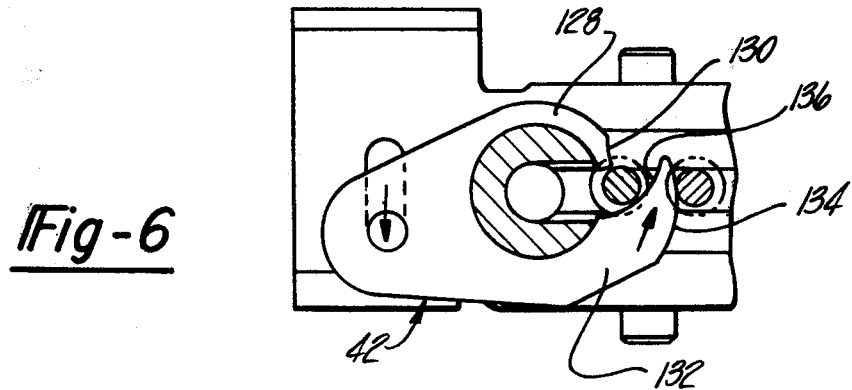
FIG. 6 is a fragmentary top view with portions broken away of the feeding apparatus of FIG. 1 with its metering arm shown in the advanced position.

The leading screw 10 in the chute 16 can be advanced toward the pilot passageway 44 while the remaining screws are restrained from advancing toward the passageway by advancement of the metering arm to the position shown in FIG. 6 which inserts a separation finger 132 between the leading and immediately succeeding screws. The shank of the immediately succeeding screw bears on an arcuate abutment face 134 on the leading edge of the finger 132 when the finger is in the advanced position. As the finger 132 moves to the advanced position, it also rapidly moves the leading screw 10 into the pilot passageway 44, by striking the shank of the leading screw with an arcuate cam face 136 on the trailing edge of the finger 132. The cam face 136 is spaced sufficiently from the tip of finger 128 so that the shank of the leading screw may pass therebetween with a slight clearance as the leading screw slides across the guide shoulders 58 and drops into the upper end of the passageway 44 (FIG. 5).

As shown in FIG. 1, apparatus 18 is normally installed for use by securing the housing 36 to the lower end of the rails 22 of the inclined chute 16 so that the guide shoulders 58 lie essentially in the plane of and project beyond the ends of the upper face of the rails. Clearance for the metering arm 42 is provided by slots 138 in the lower ends of the rails. The inlet port 76 of the feeding apparatus 18 is connected through the conduit 72 and the control valve 71 which is preferably solenoid operated to the source 70 of compressed air which is preferably, although not necessarily, at a working pressure in the range of about 50 to 100 PSIG. To convey the screws 10 to the power tool 12, one end of the flexible hose 20 is connected to the outlet spout 56 of the feeding apparatus 18 and the other end is connected to an adapter (not shown) on the power tool 12 which orients and releasably positions each screw for being driven into a workpiece by the power tool.

When no compressed air is supplied to apparatus 18, the piston 94 is retracted by the spring 98 so that the metering arm 42 is in the position shown in FIG. 4 with retention finger 128 projecting into the space between the rails 22 of the chute so that abutment 130 bears on the shank of the leading screw 10 in the lower end of the chute thereby preventing all of the screws from advancing into the passageway 44 of the feeding apparatus.

To cycle the apparatus 18 to feed one screw 10 from the chute 16 through the hose 20 and into the power tool 12, the control valve 71 is actuated to admit compressed air to both the cylinder 96 and the aspirator ports 68. This advances piston 94 which rotates metering arm 42 counterclockwise to the position shown in FIG. 6. This rotation of arm 42 rapidly extends finger 132 between the shanks of the first screw and the immediately succeeding screw in the chute 16, and retracts finger 128 to disengage abutment 130 from the shank of the first screw. This movement of the finger 132 causes the abutment face 134 to bear on the shank of and thereby prevent advancement of the immediately succeeding screw while the cam face 136 strikes the shank of the first screw with sufficient force to propel the first screw across the guide shoulders 58, through the slots 64 and 62, and into the entrance end of the pilot passageway 44 (FIG. 5).

Immediately upon entry, the screw is accelerated generally axially in the passageway 44 from the position shown in FIG. 5 due to the effect of the aspiration or partial vacuum produced in the upper portion of the passageway by the compressed air being discharged through the aspirator ports 68. This initial acceleration is usually but not necessarily assisted by the effect of gravity on the screw. The screw rapidly moves into the streams of compressed air discharged from the ports 68 which further accelerates and propels the screw out of the pilot passageway 44, through the hose 20, and into the adapter on the power tool 12.

Figure 7:
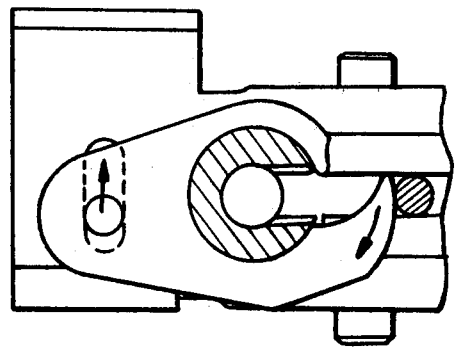
FIG. 7 is a fragmentary top view with portions broken away of the feeding apparatus of FIG. 1 with its metering arm shown at an intermediate state of returning to the retracted position.

After the screw has been fed to the power tool 12, the valve 71 is actuated to shut off the supply of compressed air to the feed apparatus 18. This relieves the pressure in cylinder 96 so that the piston 94 is retracted by spring 98, thereby rotating the metering arm 42 clockwise as shown in FIG. 7 so that it returns to the position shown in FIG. 4, thereby permitting the screws 10 in the chute 16 to advance so that another screw bears on the abutment 130 of the restraining finger 128 of the metering arm. This completes the cycling of the feed apparatus 18 and positions another screw so that on the next cycle, it will be transferred into the apparatus 18 and fed to the power tool 12.

The compressed air is usually admitted to the feed apparatus 18 for less than one second for each cycle and in operation, feed rates as high as 100 articles per minute, have been obtained. Apparatus 18 will feed articles regardless of the orientation of the pilot passageway 44 and even operates satisfactorily when the apparatus is turned upside down so that the outlet of the passageway is directly above its inlet and, hence, the effect of gravity opposes propulsion of an article through the passageway. In operation, the apparatus 18 will consistently propel articles through at least 20 feet of flexible hose and is believed to be capable of propelling an article about twice as far as it would be propelled by the feeding apparatus of U.S. Pat. No. 3,247,874.

Figure 9:
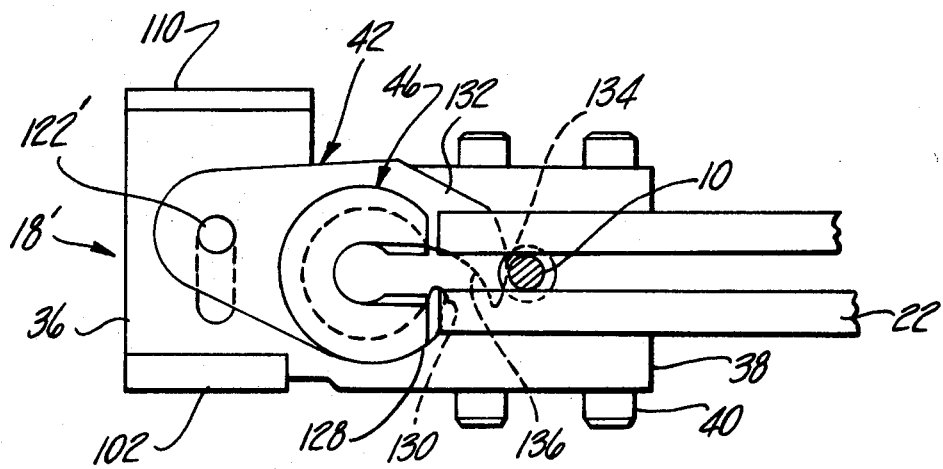
FIG. 9 is a fragmentary top view of a modified form of the feeding apparatus of FIG. 1 with its metering arm shown in the retracted position.
Figure 10:
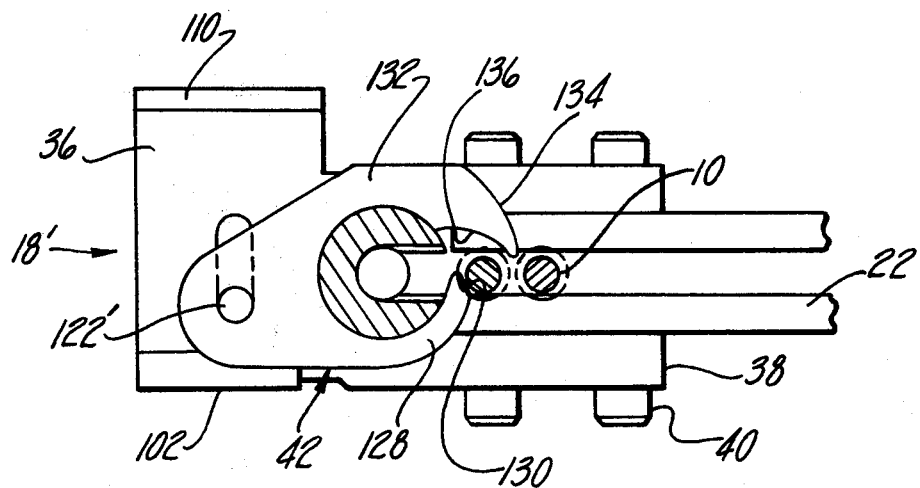
FIG. 10 is a fragmentary top view with portions broken away of the feeding apparatus of FIG. 9 with its metering arm shown in the advanced position.

FIGS. 9 and 10 illustrate a modified feeding apparatus 18' embodying this invention which is the same as feed apparatus 18 except that metering arm 42 is turned over and the pin 122' projects from the opposite face of the arm to connect the arm with the piston 94. The maximum feed rate of apparatus 18' is less than that of apparatus 18 and apparatus 18' is usually used where it is necessary to feed articles a very long distance through a hose and, particularly, if an initial portion of the hose extends generally vertically downwardly for several feet. Apparatus 18' must be mounted so that when in use, the pilot passageway 44 extends generally vertically downward.

When no compressed air is supplied to apparatus 18', the piston 94 is retracted by the spring 98 so that the metering arm 42 is in the position shown in FIG. 9 with finger 132 projecting into the space between the rails 22 of the chute 16 so that abutment face 134 bears on the shank of the leading screw 10 at the lower end of the chute, thereby preventing all of the screws from advancing into the passageway 44 of the apparatus.

To cycle the apparatus 18' to feed one screw 10 from the chute 16 into the passageway 44, the control valve 71 is actuated to admit compressed air to both the cylinder 96 and the aspirator port 68. This advances piston 94 which rotates the metering arm 42 counterclockwise to the position shown in FIG. 10. This rotation of arm 42 retracts finger 132 and extends finger 128 into the space between the rails 22 of the chute so that the abutment 130 bears on the shank of the leading screw, thereby permitting all of the screws to advance toward the pilot passageway 44 while preventing the screws from entering the pilot passageway of the feeding apparatus.

After the screws have been advanced to the position shown in FIG. 10, valve 71 is actuated to shut off the supply of compressed air to the feeding apparatus 18'. This relieves the pressure in cylinder 96 so that the piston 94 is retracted by spring 98, thereby rotating metering arm 42 clockwise so that it returns to the position shown in FIG. 9. This rotation of the metering arm 42 extends finger 132 between the shanks of the first or leading screw and the immediately succeeding screw in the chute 16 and retracts finger 128 to disengage its abutment 130 from the shank of the leading screw. This movement of the finger 132 causes its abutment face 134 to bear on the shank and thereby prevent advancement of the immediately succeeding screw while the cam face 136 strikes the shank of the leading screw with sufficient force to propel the leading screw across the guide shoulders 58, through the slot 62 and 64, and into the entrance end of the pilot passageway.

Due to gravity, this leading screw drops or falls through the pilot passageway 44 and the generally vertically downward extending initial portion of the hose 20, and then the screw comes to rest in the hose. The control valve 71 is again actuated to admit compressed air to both the cylinder 96 and the aspirator ports 68. The streams of compressed air issuing from the aspirator ports 68 propel the first screw through the remaining portion of the hose 20 and into the power tool 12.

Thereafter, the control valve 71 is actuated to shut off the supply of compressed air to the feeding apparatus 18′, thereby causing arm 42 to be rotated counterclockwise to the position shown in FIG. 9. This movement of the metering arm 42 transfers another screw into the entrance end of the pilot passageway 44 whereupon, due to gravity, this screw drops through the pilot passageway 44 and the generally vertically downward extending initial portion of the hose, and then comes to rest in the hose. Upon each subsequent cycling of apparatus 18′, a screw deposited in the hose on the prior cycle is propelled by compressed air through the hose and, thereafter, another screw is transferred from the chute into the pilot passageway.

I claim:

1. An apparatus for transferring articles from a source of supply in which a succession of the articles are in side-by-side relation and feeding one article at a time generally longitudinally through a conduit, said apparatus comprising: a housing having a bore therethrough; a separate barrel received in said bore and removably carried by said housing; a pilot passageway extending generally longitudinally through said barrel; an inlet to said passageway through which an article may enter into said passageway with its axis oriented generally parallel to the longitudinal axis of said passageway, an outlet from said passageway longitudinally spaced from said inlet and constructed and arranged for communicating said passageway generally coaxially with the conduit; at least one discharge port in said barrel, communicating with said passageway, and constructed and arranged to discharge a stream of gas at super atmospheric pressure into said passageway and generally toward said outlet for propelling an article through the conduit when connected to said outlet; a metering arm removably carried by said housing, movable to first and second positions, and constructed and arranged to feed one article at a time from the source of supply through said inlet and into said passageway; and a fluid drive motor carried by said housing, operably connected with said metering arm, and constructed and arranged to move said metering arm from at least one to the other of said first and second positions of said metering arm.

2. The apparatus of claim 1 which also comprises a bearing on said barrel and wherein said metering arm is removably received and journaled on said bearing on said barrel for rotational movement relative to said housing.

3. The apparatus of claim 2 wherein said barrel is also constructed and arranged to releasably retain said metering arm on said housing.

4. The apparatus of claim 3 which also comprises retainer means carried by one of said housing and said barrel and constructed and arranged to releasably retain said barrel in said bore of said housing.

5. The apparatus of claim 1 which also comprises retainer means carried by one of said housing and said barrel and constructed and arranged to releasably retain said barrel in said bore of said housing.

6. The apparatus of claim 1 wherein said fluid motor comprises a cylinder in said housing, and a piston slidably received is said cylinder, operably connected with said metering arm, and constructed and arranged to move said metering arm to at least one of said first and second positions in response to admission of a fluid at super atmospheric pressure into said cylinder.

7. The apparatus of claim 1 wherein said fluid motor comprises a cylinder bore through said housing, a piston slidably received in said cylinder bore and operably connected with said metering arm, cover plates overlying and closing the opposed ends of said cylinder bore and releasably secured to said housing, and means received in said cylinder to yieldably bias said piston toward one end of said cylinder and said metering arm to one of said first and second positions of said metering arm.

8. The apparatus of claim 1 wherein said metering arm has first and second fingers, one of said first and second fingers is constructed and arranged so that when said arm is in said first position such one finger bears on the leading article of the succession of articles to prevent all of the articles from moving through said inlet and into said pilot passageway and when said arm is moved to said second position such one finger disengages the leading article to permit the leading article to move past such one finger, and the other of said first and second fingers is constructed and arranged so that when said arm is in said first position such other finger is disengaged from the leading article in the succession of articles and when said arm is in said second position such other finger bears on one of the articles to prevent it and the succeeding articles in the succession of articles from moving through said inlet and into said passageway, and said first and second fingers are constructed and arranged and spaced apart sufficiently such that when said fluid motor moves said arm from one of said first and second positions to the other of said first and second positions, the leading article in the succession of articles is fed from the source of supply through said inlet and into said passageway.

9. The apparatus of claim 8 wherein said metering arm is constructed and arranged and removably carried by said housing so that with a first orientation of said fingers with respect to the articles when the fluid motor moves said arm from said first to said second position such one finger disengages the leading article to permit the leading article to move past such one finger and through said inlet and into said passageway, and when said metering arm is carried by said housing with said fingers in a second orientation with respect to the articles which differs from said first orientation and said arm is moved by said fluid motor from said second to said first position such other finger disengages from the leading article to permit the leading article to move past such other finger and through said inlet and into said passageway.

10. The apparatus of claim 9 wherein one of said first and second fingers also comprises a cam constructed and arranged to move a leading article toward said inlet to said passageway as said metering arm is moved by said fluid motor from such one of said first and second positions to the other of such first and second positions.

11. The apparatus of claim 1 which also comprises interconnected passages in said housing constructed and arranged to simultaneously supply gas at super atmospheric pressure to both said fluid motor and said discharge port.

12. The apparatus of claim 1 which also comprises a plurality of said discharge ports in said barrel, said ports being circumferentially spaced generally equally around said pilot passageway and constructed and arranged to discharge a stream of gas at super atmospheric pressure into said passageway to move by aspiration an article in said passageway from said inlet into the stream of gas discharged from said ports for propelling the article through said passageway and the conduit when connected to said outlet from said passageway.

13. The apparatus of claim 12 wherein the axis of each of said discharge ports is inclined at an acute and included angle to the axis of said pilot passageway in the range of about 5° to 30°.

14. The apparatus of claim 12 which also comprises inter-connected passageways in said housing constructed and arranged to simultaneously supply gas at super atmospheric pressure to both said fluid motor and said discharge ports.

* * * * *